United States Patent Office 2,987,959
Patented June 13, 1961

2,987,959
DEVICE FOR CONTROLLING ELECTROMAGNETIC RADIATION

Heinz Kimmel, Erlangen, Germany, assignor to Siemens-Schuckertwerke Aktiengesellschaft, Berlin-Siemensstadt and Erlangen, Germany, a corporation of Germany
Filed May 23, 1958, Ser. No. 737,268
Claims priority, application Germany May 28, 1957
15 Claims. (Cl. 88—61)

My invention relates to apparatus for controlling electromagnetic radiation by means of devices generally of the optical type, the term electromagnetic radiation being understood to relate to the visible as well as the invisible ranges of the wave-energy spectrum.

For modulating or otherwise controlling the intensity of light, predominant use has heretofore been made of Kerr cells. In such cells, an optical filter forms the dielectric of a capacitor and is caused to vary its degree of transparency or to become opaque by applying an electric potential to the capacitor electrodes. Kerr cells, however, require very high voltages for controlling a light beam of relatively large cross section.

Another possibility of light-intensity control, heretofore only of scientific interest, is offered by the Faraday effect according to which the polarization plane of polarized light is rotated under the influence of a magnetic field. The reason why the Faraday effect has found virtually no technical application is the fact that the substances heretofore known to be applicable as optical bodies exhibiting the Faraday effect were magnetically responsive to an only slight and insufficient degree.

It is an object of my invention to provide a control device for electromagnetic radiation which, utilizing the Faraday effect, secures a technologically sufficient degree of magnetic control as required for practical application.

According to one of the features of my invention I subject to the controlling magnetic field an optically active member that consists of a crystalline body of semiconducting substance characterized by a steep absorption edge in the immediate vicinity of the short-wave limit of the radiation range to be controlled, the steepness condition for the absorption edge of the semiconductor body being further explained below. The semiconducting optical member is traversed by a beam of light or other electromagnetic radiation which is polarized, for example, by first passing through a polarizer filter; and the magnetic field in the semiconducting member is effective to rotate the plane of polarization so that an analyzer filter, following the semiconducting optical member in the beam path, will permit the passage of polarized radiation to an extent dependent upon the angle of magnetically produced rotation. As a result, the intensity of the light leaving the analyzer can be controlled with the aid of the magnetic field in accordance with the Faraday effect. The specific magnitude of this effect, that is, the particular amount of rotation of the polarization plane by means of a magnetic field acting upon a given optical material is called "Verdet's constant." This constant is defined as the rotation of the polarization plane in angular minutes for a layer thickness of 1 cm. traversed by the polarized radiation when a magnetic field of 1 oersted is applied.

Since the inertia of the Faraday effect is extraordinarily slight, being smaller than $10^{-9}$ second, a magnetic field can thus be used for performing a high-frequency modulation. Consequently, when referring in this specification to a control device, this term is understood to also comprise devices for modulating purposes and for any other control of electromagnetic wave energy or radiation in the broadest sence of these terms. For example, the invention is also applicable to high-speed electro-optic shutters and other apparatus in which an electromagnetic radiation is influenced in accordance with the Faraday effect by means of a control or signal magnitude represented or simulated by a magnetic field.

As indicated above, Verdet's constant in the substances heretofore considered suitable for demonstration of the Faraday effect is so slight as to be insufficient for technological application of this effect. However, if according to my invention the optical medium subjected to the magnetic control field is made of crystalline semiconductor substance having a steep absorption edge near the short-wave limit of the radiation range to be controlled, the corresponding magnitude of Verdet's constant is so great as to permit the utilization of the Faraday effect to an extent sufficient to take the place of the Kerr effect heretofore employed for such purposes. This has the advantage of avoiding the high voltages often required for the Kerr effect and makes such conrtol devices useful in new fields of application for which the Kerr effect has been unsuitable or impracticable.

Substances that satisfy the above-mentioned requirements of the invention are available in the semiconducting elements of the fourth group of the periodic system, particularly germanium and silicon. Preferably and most advantageously applicable, however, are the semiconducting compounds of the type $A_{III}B_V$, namely compounds of an element selected from boron, aluminum, gallium and indium with an element selected from nitrogen, phosphorus, arsenic and antimony (BN, BP, BAs, BSb, AlN, AlP, AlAs, AlSb, GaN, GaP, GaAs, GaSb, InN, InP, InAs, InSb). These semiconducting substances and their preparation are known, for instance, from U.S. Patent 2,798,989 of H. Welker, assigned to the assignee of the present invention. The semiconducting substances, including germanium and silicon, when prepared in crystalline form suitable for optical purposes, are distinguished by an absorption edge which is relatively steep and occurs for each individual element or compound at the short-wave edge of a particular range of wave lengths. The location of this absorption edge in the wave spectrum is determined by the width of the forbidden zone of each semiconductor and is defined by the energy limit above which the energy of photons radiated into the semiconductor is sufficient to lift electrons from the valency band into the conductance band. It follows that the suitability of the abovementioned semiconductors for any given range of wave lengths follows from the width of the forbidden zone. The outstanding advantage of the $A_{III}B_V$ compounds in Faraday-effect devices according to the invention will be realized if one considers that by virtue of the large number of these compounds and the fact that the respective widths of their forbidden zones jointly cover a wide spectral range, virtually the entire infrared, visible and ultraviolet and shorter-wave range of the electromagnetic spectrum can be dominated, encountering only slight gaps which, however, can also be made subject to control as explained below.

For further explaining the invention, reference is made to the drawings in which.

Figure 1:
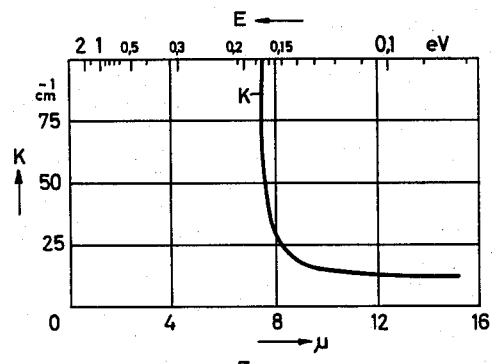
FIG. 1 is a coordinate diagram showing the shape and spectrum location of the values of the absorption constant of indium antimonide (InSb).
Figure 2:
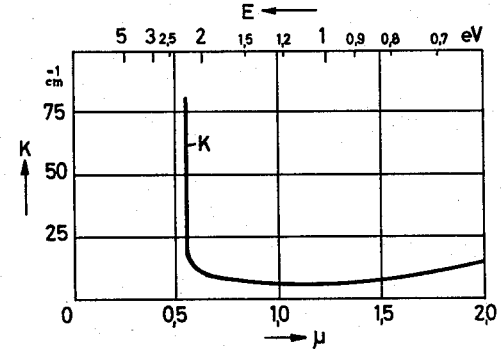
FIG. 2 is a coordinate diagram relating to the values of the absorption constant of gallium phosphide (GaP).

In the diagrams of FIGS. 1 and 2, the respective lower abscissas indicate the wave lengths in micron ($\mu$), the respective upper abscissas denote the corresponding energy values in electron volt (e.v.), and the respective ordinates indicate the values of the absorption constant K in cm.$^{-1}$. In view of the above-described features of the invention, it is apparent that indium antimonide, having a width of the forbidden zone of approximately 0.17 e.v., is well suitable as an optical medium in a device according to the invention for the control of infrared radiation whose short-wave limit is at about 7$\mu$. In contrast thereto, gallium phosphide, having a forbidden zone of about 2.3 e.v. width, is particularly well suitable, according to FIG. 2, for controlling visible light whose short-wave limit is at approximately 0.5$\mu$.

The curves of the absorption constants K of both substances are of relatively great steepness. Generally, a semiconductor satisfies the above-mentioned, required steepness of the absorption edge if the differential quotient of the absorption curve over the wave length is at least 10$^6$ cm.$^{-2}$ in the range of the absorption constant. That is, the value $$\frac{\partial K}{\partial \mu}$$

must be 10$^6$ or more.

The term "absorption edge" is commonly employed, especially in the field of X-ray physics. An extended general discussion of absorption constants and absorption edges can be found in the textbook by R. W. Pohl, Einführung in die Optik, Springer-Verlag, 1948, particularly pages 144 and 252. The dimension of the absorption constant is mm.$^{-1}$, or cm.$^{-1}$. The steepness or slope of the curve of absorption constants, plotted against wave lengths, is the first differential; this results in the dimension cm.$^{-2}$.

As mentioned, the widths of the forbidden zones of the totality of the available $A_{III}B_V$ compounds do not cover the entire wave spectrum in a continuous manner but leave some gaps in which no control by the Faraday effect could be obtained. For that reason, mixed crystals of the semiconducting $A_{III}B_V$ are particularly suitable as optical medium in devices according to the invention because such mixed crystals permit closing the gaps between the widths of the forbidden zones of the respective individual $A_{III}B_V$ compounds. This will be explained by reference to the example of mixed crystals formed of the compounds InAs and InP, and also with reference to mixed crystals formed by the compounds GaAs and GaP. Such mixed crystals are of the type In(As$_y$P$_{1-y}$) and Ga(As$_y$P$_{1-y}$) wherein the value $y$ is larger than zero but smaller than unity (1>$y$>0). For InAs the width of the forbidden zone is approximately 0.4 e.v. InP has a forbidden zone of about 1.3 e.v. Depending upon the selected mixing parameter $y$, the mixed crystal of InAs and InP possesses a width of the forbidden zone between the limit values of 0.4 and 1.3 e.v. Consequently the corresponding spectral range can be covered without any gaps. The mixed crystal

Ga(As$_y$P$_{1-y}$)

has a forbidden zone whose width is in the range from about 1.3 to about 2.3 e.v. Hence the use of the two mixed crystals permits covering and controlling the infrared and visible range of the spectrum without any gaps. That is, by using the mixed crystals, a device according to the invention can be selectively "tailored" to suit any particular wave length or range within the spectrum between the above-mentioned limits.

Mixed crystals of the type just mentioned, as well as their manufacture, are described in the copending application of Otto Gert Folberth, Serial No. 554,361, filed December 20, 1955, and assigned to the assignee of the present invention. It issued as Patent 2,858,275.

Figure 3:
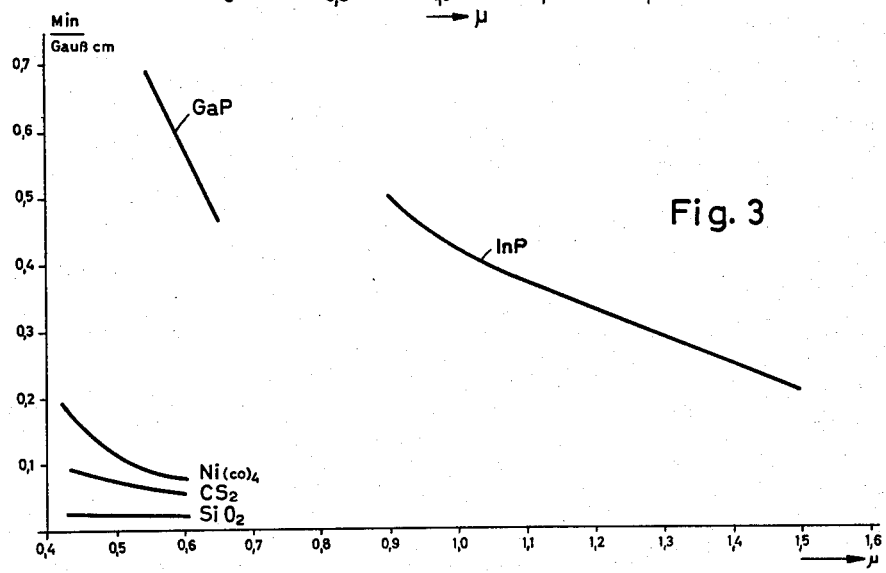
FIG. 3 is another coordinate diagram comparing Verdet's constant of some substances heretofore proposed for demonstration of the Faraday effect, with substances used according to the invention.

The diagram of FIG. 3 indicates the eminent suitability of the semiconductor compounds InP and GaP in devices according to the invention, by comparing their Verdet's constants with those of substances heretofore considered particularly suitable for exhibiting the Faraday effect, namely Ni(CO)$_4$, CS$_2$ and SiO$_2$. The abscissa indicates the wave length in micron ($\mu$), and the ordinate indicates Verdet's constant in angular minutes/Gauss·cm.

Figure 4:
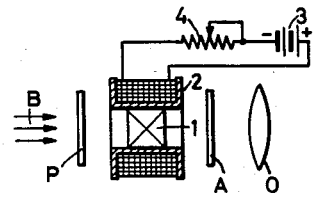
FIGS. 4 to 8 illustrate schematically five different embodiments of control devices according to the invention.

FIG. 4 illustrates a device according to the invention for use as a shutter, for example, on a photographic camera. A beam of light B passes through a polarizing filter P so as to become polarized in a given plane. The polarizer P may consist of any material suitable and known for such purposes, such as the material available under the trademark Polaroid. Disposed in the optical path of the device is a crystalline body 1 of semiconducting material as described in the foregoing, preferably a material consisting of an $A_{III}B_V$ compound or a mixed crystal of two such compounds. Located behind the semiconducting optical member 1 is an analyzer A which may consist of the same material as the polarizer P. Indicated at 0 is a lens of the camera or other lens system for which the shutter device is to be used.

The crystalline member 1 is located within the axial hollow space of a magnet coil 2 so as to be subjected to the magnetic field produced by the coil when energized. Excitation is applied to coil 2 from a current source 3 through a rheostat 4. The polarizing orientation of the analyzer A corresponds to that of the polarizer P so that when the coil 2 is not excited and hence the optical member 1 is not subjected to a magnetic field, the polarized beam of light will pass through the analyzer A into the lens system 0 in full intensity. However, when the coil 2 is energized, the magnetic field then effective in the optical member 1 causes the polarization plane of the beam of light to be rotated to an extent depending upon the intensity of the magnetic field and hence upon the selected setting of rheostat 4. In this manner, if desired, the passage of light through the analyzer A can be completely shut off.

Figure 5:
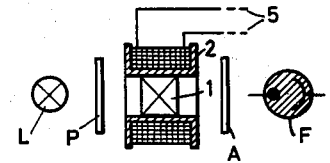

The embodiment shown in FIG. 5 exemplifies a dimmer, that is a device according to the invention for controlling the intensity of light issuing from a light source. The device comprises a lamp L, a polarizer P, an analyzer A, and a receiver here represented by a photoelectric cell F. The optical path includes a body 1 of semiconducting material as explained with reference to FIG. 4, and it will be understood that the energizing circuit 5 of the magnet coil 2 is supplied with a controlled voltage in order to correspondingly vary the intensity of the light transmitted from the source L to the object being illuminated.

Figure 6:
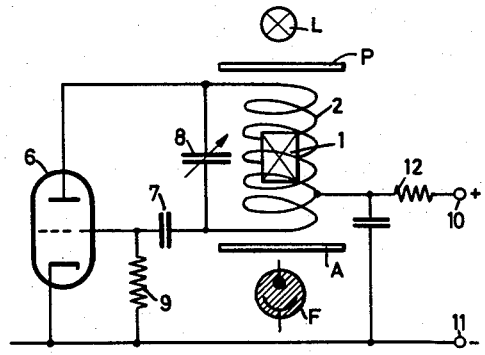

The device shown in FIG. 6 is a modulator for subjecting a beam of light to intensity modulation in accordance with an input signal. The optical system is substantially identical with that described with reference to FIGS. 4 and 5 as is apparent from the use of the same reference numerals for respective similar components. The coil 2, however, is connected with an oscillator comprising an electronic oscillator tube 6, a fixed capacitor 7, an adjustable capacitor 8 for setting a desired oscillation frequency, and a grid-circuit resistor 9. The modulating signal is supplied between terminals 10 and 11 through a resistor 12 which is connected with a tap point of coil 2, the terminal 11 being connected to the cathode lead of tube 6. The device operates to impose upon the beam of light a carrier frequency depending upon that of the oscillator, and the signal applied across terminals 10 and 11 has the effect of modulating the carrier frequency and hence also the alternating carrier variations of the light intensity. The system is thus suitable for transmitting light or other electromagnetic wave energy from the source L to a remote receiver F and using that beam for the transmission of communication.

Figure 7:
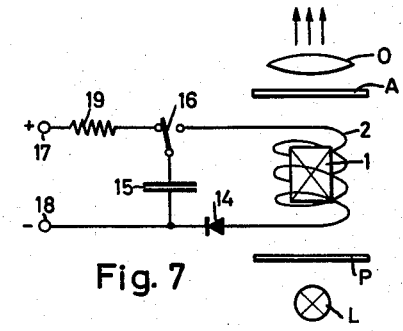

FIG. 7 represents a shutter similar to that of FIG. 4 but equipped for high-speed operation, the components of the optical system being denoted by the same reference characters as in the preceding illustrations. The coil 2 is connected in series with a half-wave rectifier 14 across a capacitor 15 under control by a switch 16. When switch 16 is in the illustrated position the capacitor 15 is charged from current supply terminals 17 and 18 through a resistor 19. When switch 16 is placed in the other position, the capacitor 15 suddenly discharges through the coil 2 thus causing the polarization plane of the light to be abruptly rotated to shut-off condition in the manner described above with reference to FIG. 4.

Figure 8:
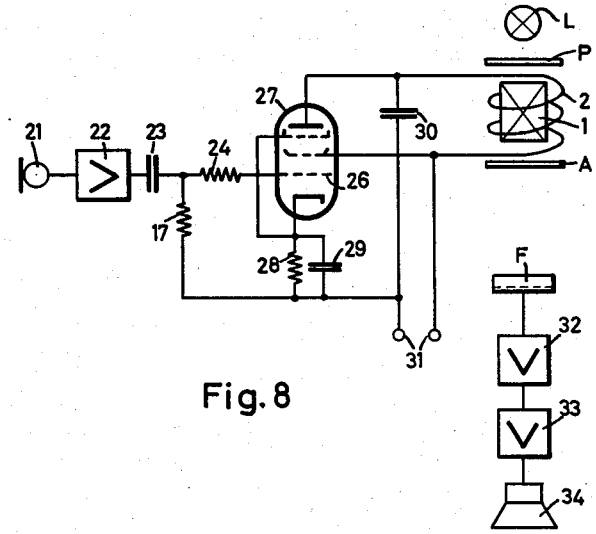

FIG. 8 illustrates a system according to the invention in which visible or individual light is used for the transmission of sound. A microphone 21 is connected through a pre-amplifier 22 and through a capacitor 23 (.05 µf.) to the control grid 26 of a pentode through a grid resistor 24 (5 K ohm) and a coupling resistor 17 (500 K ohm). The cathode circuit of tube 27 comprises a resistor 28 (50 ohm) in parallel relation to a capacitor 29 (100 µf.). The plate circuit of tube 27 is energized from terminals 31 and comprises the above-mentioned coil 2 for controlling the rotation of the polarization plane of the light passing from source L through polarizer P, semiconductor body 1 and analyzer A to a remote receiving station. Connected across the cathode lead and the anode of tube 27 is a capacitor 30 (500 pf.).

The source L may consist of a projection lamp (50 watts, 12 volts). The coil 2 may be given 4,500 turns of copper wire .3 mm. thick. The inner diameter of the coil may be 20 mm. and the axial length 55 mm. Used as an optical member 1 was a semiconductor body consisting of gallium phosphide in the shape of a cube 6 x 6 x 6 mm. The receiving system comprises a selenium photocell F operating a loudspeaker 34 through a pre-amplifier 32 and a power amplifier 33.

The system permits the transmission of sound by means of visible or invisible light which excludes "wire-tapping" and makes unauthorized listening-in extremely difficult.

As far as the design of the magnetic field means is concerned, I prefer using a magnetic excitation coil as shown at 2 in FIGS. 4 and 5, without any iron core. This is possible in view of the fact that the Faraday effect with the substances to be used according to my invention is sufficiently great to permit the use of iron-free coils. This is the reason why such devices are suitable for producing high-frequency modulation fields. In cases where it is desired, when operating with low-frequency fields, to achieve an extremely strong Faraday effect, the magnetic field means in devices according to the invention may also be given an iron core, with the semiconductor body located in the field gap of the core.

It will be obvious to those skilled in the art, upon a study of this disclosure, that my invention permits of various uses and may be embodied in apparatus of various design, including equipment other than the devices particularly illustrated and described herein, without departing from the essence of the invention and within the scope of the claims annexed hereto.

I claim:

1. A device for controlling electromagnetic radiation comprising an optical system defining an optical path for the radiation, said radiation being in the range from ultra-violet to infra-red, said system having a polarizer member in said path for polarizing the radiation and having an optical member following said polarizer member in said path, magnetic field means having a controllable magnetic field in which said optical member is located, said optical member consisting of a crystalline semiconductor body permeable to said radiation and having a steep absorption edge substantially coincident with the shortest wave length of the radiation to be controlled, and having $10^6$ cm.$^{-2}$ minimum steepness of said adsorption edge, whereby the radiation passing through said body is controlled by said field means causing rotation of the polarization plane of said radiation.

2. In a device for controlling electromagnetic radiation according to claim 1, said optical member consisting essentially of a crystalline body of an element elected from the group consisting of germanium and silicon.

3. In a device for controlling electromagnetic radiation according to claim 1, said optical member consisting essentially of a crystalline body of a semiconducting compound formed of substance selected from the group consisting of boron, aluminum, gallium and indium with substance selected from the group consisting of nitrogen, phosphorus, arsenic and antimony.

4. In a device for controlling electromagnetic radiation according to claim 1, said optical member consisting essentially of a crystalline body of gallium phosphide.

5. In a device for controlling electromagnetic radiation according to claim 1, said optical member consisting essentially of a crystalline body of indium phosphide.

6. In a device for controlling electromagnetic radiation according to claim 1, said optical member consisting essentially of a crystalline body of a mixed crystal formed of two different binary compounds each formed of substance selected from the group consisting of boron, aluminum, gallium and indium with substance selected from the group consisting of nitrogen, phosphorus, arsenic and antimony.

7. In a device for controlling electromagnetic radiation according to claim 1, said optical member consisting essentially of a crystalline body of a mixed crystal formed of indium arsenide and indium phosphide.

8. In a device for controlling electromagnetic radiation according to claim 1, said optical member consisting essentially of a crystalline body of a mixed crystal formed of gallium arsenide and gallium phosphide.

9. A device for controlling electromagnetic radiation, said radiation being in the range from ultra-violet to infra-red, comprising an optical system defining an optical path for the radiation and having a polarizer member in said path for polarizing the radiation, an optical member following said polarizer member in said path, and an analyzer member following said optical member, magnetic field means having a controllable magnetic field in which said filter member is located, said optical member consisting of a crystalline semiconductor body permeable to said radiation and having an absorption edge substantially coincident with the shortest wave length of the radiation to be controlled and of $10^6$ cm.$^{-2}$ minimum steepness, whereby the radiation passing through said analyzer member is varied by variation of said magnetic field.

10. A magneto-optical device for controlling electromagnetic radiation, said radiation being in the range from ultra-violet to infra-red, comprising means defining an optical path for the radiation to be controlled and having an optical member located in said path, a magnet coil arranged about said path in coaxial relation thereto and having within said coil a magnetic field in which said optical member is located, said optical member consisting of semiconducting crystalline substance permeable to the radiation to be controlled and having a steep adsorption edge substantially coincident with the shortest wave length of the radiation to be controlled and of $10^6$ cm.$^{-2}$ minimum steepness, and controllable electric current supply means connected with said coil for varying said field to thereby control said radiation.

11. A magneto-optical device for controlling electromagnetic radiation, said radiation being in the range from ultra-violet to infra-red, comprising means defining an optical path for the radiation to be controlled and having an optical member located in said path, a magnet coil arranged about said optical member and having an interior magnetic field in which said optical member is located, said optical member consisting of semiconducting crystalline substance permeable to the radiation to be controlled and having a steep adsorption edge substantially coincident with the shortest wave length of the radiation to be controlled and of $10^6$ cm.$^{-2}$ minimum steepness, a polarizer and an analyzer disposed in said path ahead and arrear of said optical member, and controllable electric circuit means connected with said coil for varying said field to thereby control said radiation.

12. A magneto-optical control device for modulating electromagnetic radiation, said radiation being in the range from ultra-violet to infra-red, comprising means defining an optical path for the radiation to be controlled and having an optical member located in said path, said optical member being a semiconducting crystalline member through which the radiation passes and which has a steep adsorption edge substantially coincident with the shortest wave length of the radiation being controlled and of $10^6$ cm.$^{-2}$ minimum steepness, magnetic field means having a field in said optical member and having an excitation coil for controlling said field, a source of polarized radiation to be modulated, an analyzer member, said source and said analyzer member being disposed in said path on opposite sides respectively of said optical member, a radiation receiver located following said analyzer member on said path, and a source of modulating voltage connected to said coil for varying said field.

13. A magneto-optic system for providing controllable light rays, comprising a source of polarized light rays in the range of visible and invisible light, a set of crystalline light transmitting semiconductor members, each adapted for placement in the path of said rays for passage of the rays therethrough, the set covering a substantially continuous spectrum in said range, the semiconductor material of at least one of said members being a binary $A_{III}B_V$ semiconductor and at least one other being a mixed crystal of binary $A_{III}B_V$ semiconductors, said members having an adsorption edge substantially coincident with the shortest wave length of the range of radiation to be controlled, and having about $10^6$ cm.$^{-2}$ minimum steepness of said edge, and magnetic field means for producing a magnetic field in the path of said rays passing through the placed semiconductor member.

14. A magneto-optic system for providing controllable light rays, comprising a source of polarized light rays in the range of visible and invisible light, a set of crystalline light transmitting semiconductor members, each adapted for placement in the path of said rays for passage of the rays therethrough, the set covering a substantially continuous spectrum in said range, the semiconductor material of at least one of said members being a binary $A_{III}B_V$ semiconductor and at least one other being a mixed crystal of binary $A_{III}B_V$ semiconductors, said mixed crystal being of the type formula $In(As_yP_{1-y})$ wherein $y$ is greater than zero but less than 1, said members having an adsorption edge substantially coincident with the shortest wave length of the range of radiation to be controlled, and having about $10^6$ cm.$^{-2}$ minimum steepness of said edge, and magnetic field means for producing a magnetic field in the path of said rays passing through the placed semiconductor member.

15. A magneto-optic system for providing controllable light rays, comprising a source of polarized light rays in the range of visible and invisible light, a set of crystalline light transmitting semiconductor members, each adapted for placement in the path of said rays for passage of the rays therethrough, the set covering a substantially continuous spectrum in said range, the semiconductor material of at least one of said members being a binary $A_{III}B_V$ semiconductor and at least one other being a mixed crystal of binary $A_{III}B_V$ semiconductors, said mixed crystal being of the type formula $Ga(As_yP_{1-y})$ wherein $y$ is greater than zero but less than 1, said members having an adsorption edge substantially coincident with the shortest wave length of the range of radiation to be controlled, and having about $10^6$ cm.$^{-2}$ minimum steepness of said edge, and magnetic field means for producing a magnetic field in the path of said rays passing through the placed semiconductor member.

References Cited in the file of this patent

UNITED STATES PATENTS

| | | |
|---|---|---|
| 1,642,011 | Chubb | Sept. 13, 1927 |
| 2,442,396 | Bubb et al. | June 1, 1948 |
| 2,776,367 | Lehovec | Jan. 1, 1957 |
| 2,798,989 | Welker | July 9, 1957 |
| 2,858,275 | Folberth | Oct. 28, 1958 |

OTHER REFERENCES

"Magnetic Optical Band Gap Effect in In Sb," Burnstein, Physical Review, vol. 103, pages 826–828, Aug. 1, 1956.